(No Model.)
A. P. GROSS.
BOLTING CHEST.
No. 244,389. Patented July 19, 1881.
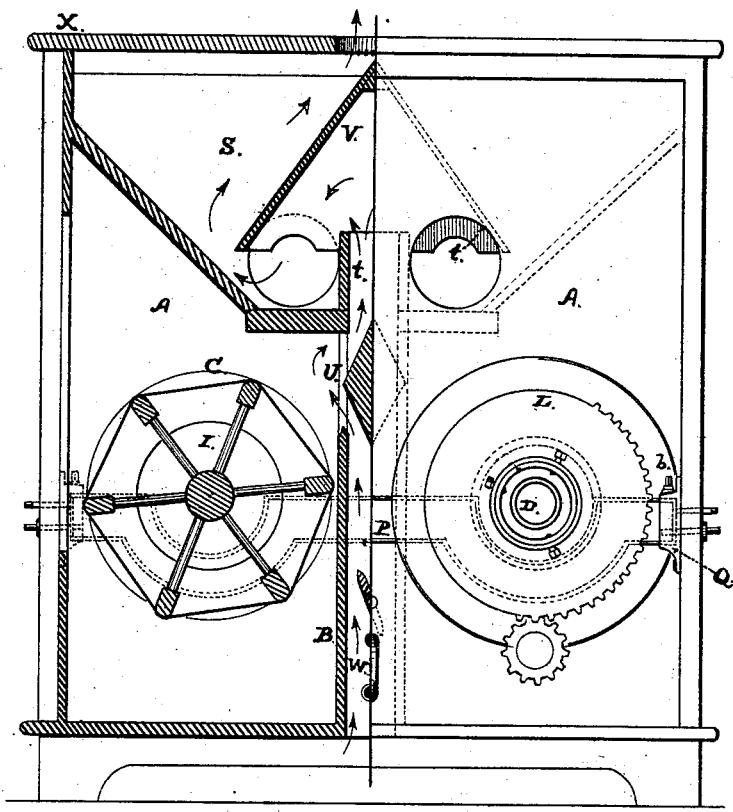
Fig. 1.
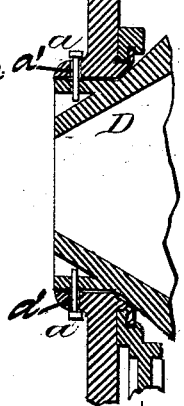
Fig. 5.
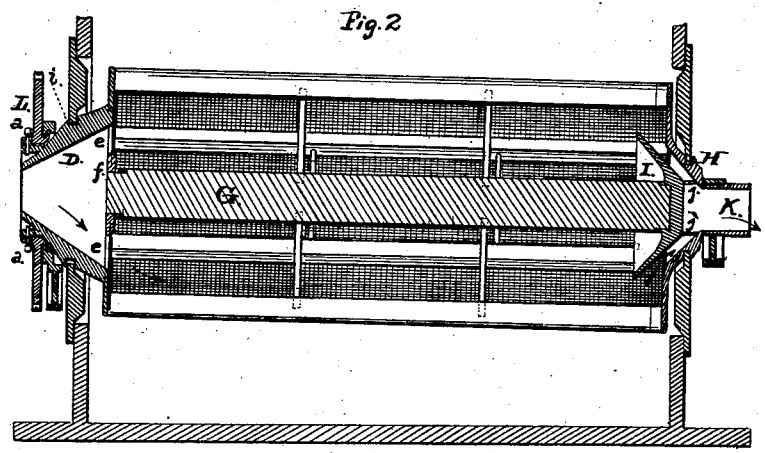
Fig. 2.
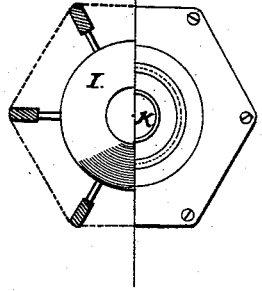
Fig. 3.
Fig. 4.
Witnesses
Edward E. Osborn
Wm. P. Clark
Inventor
Alexander P. Gross,
by his Atty.
J. L. Boone

UNITED STATES PATENT OFFICE.

ALEXANDER P. GROSS, OF SAN FRANCISCO, CALIFORNIA.

BOLTING-CHEST.

SPECIFICATION forming part of Letters Patent No. 244,389, dated July 19, 1881.

Application filed April 5, 1880. (No model.)

*To all whom it may concern:*

Be it known that I, ALEXANDER P. GROSS, of the city and county of San Francisco, in the State of California, have invented certain new and useful Improvements in Bolting-Chests for Flour-Mills; and I do hereby declare that the following is a full, clear, and exact description thereof, reference being had to the accompanying drawings.

My invention comprises several features of improvement in the construction of the reel and flour-chamber of a bolting-chest. It also includes an arrangement for ventilating the flour-chamber and reel, and withdrawing the impalpably fine flour that floats in the air into a condensing or settling chamber, thereby producing a new and superior grade of flour, all as hereinafter described.

Referring to the accompanying drawings, Figure 1 is an end elevation of my improved chest, one-half being shown in vertical section. Fig. 2 is a vertical longitudinal section through one of the reels. Fig. 3 is an end view of Fig. 2, one-half being shown in vertical section. Fig. 4 is a detail view of the supporting bar or bridge. Fig. 5 is an enlarged detailed section of the driving-wheel and reel-head or casting.

In constructing my bolting-chest I prefer to make two flour-chambers, A A, close together, and separate them by a double wall-partition, B B. Between these walls I leave an air-space, as hereinafter described. Each flour-chamber is closely walled in, except a circular opening at each end, through which the ends of the reel C project. The heads of the reel I cast as follows: The feed end D is cast conical, with radial arms *e e* connecting the periphery across the wide end with a central hub, *f*, in which hub the end of the center shaft, G, is secured. The parallel reel-bars I secure to the periphery of the wide end, while the small end of the conical head passes through the opening in the end of the chamber and projects on the outside. A groove, *i*, is made around this conical head to receive the edge of the opening, thus forming a tight joint and bearing for that end. The flour is fed into the reel through the hole in the center or apex of the cone, and the inclined sides of the cone carry it down onto the bolting-cloth. The opposite or discharge head H of the reel is cast with a conical recess in its center, on the inside of the head. A conical or cup-shaped disk, I, is cast with its apex entering the conical recess. This disk is connected at intervals with the conical center of the head by ribs *j*, so as to leave openings between the ribs, through which the chop will pass to the discharge passage or tube K, which projects from the center of the head on the outside of the chamber. The end wall of the chamber is fitted to this head by a groove similar to that described for the head at the feed end, so that it is perfectly tight. The chop, when it arrives at the lower end of the reel, is caught in the openings between the head and disk, and the ribs *j* conduct it to the discharge-tube, thus providing a center feed and a center discharge, and at the same time providing tight ends for the flour-chamber.

The driving gear-wheel L, I attach to the outer projecting end of the head-casting, at the feed end of the reel, by an arrangement which permits it to stand vertical. This consists of a V-shaped bearing turned on the outer end of the feed-head, to which the wheel L is bolted, as at *a a*. To permit of the adjustment of the reel at an inclination without disturbing the verticality of the driving-wheel, the latter is slotted around its holding-bolts *a*, as fully shown in Fig. 5 at *a'*, allowing the wheel to have slight movement laterally upon the reel-head or casting.

The beam or bridge-tree P, which supports the reel at each end of the chest, I make of cast-iron, and I support its ends in cast-iron shoes Q, which are secured to the uprights at each side of the chest. I secure the ends of the bridge-trees in the shoes by means of bolts *b*, which pass vertically down through the top of the shoes and through the bridge-trees, so that I can level the beam by means of the screws.

Above each flour-chamber I construct a condensing or settling chamber, S. A double partition, *t t*, separates these two chambers, and the walls extend downward a short distance, so as to be directly above the double partitions that separate the flour-chambers, but not far enough to connect with them. In the space between the two partitions I construct a diamond-shaped box, U, so that one sharpened end of the box extends down between the upper ends of the lower partitions, while the other extends up between the upper partitions, as shown. This box forms deflectors for directing the current of air, as hereinafter described. Over the double walls in the condensing-chambers I place a hood, V, which directs the air-currents down into the settling-chambers on each side.

In the space between the lower partitions I construct a to-and-fro returned steam-pipe, W, through which steam passes, in order to heat and dry the air that passes up through the space, and thus prevent condensation in the flour-chambers. I establish a draft or current of air from below the chest, up between the partition walls, and around the steam-pipe into the flour-chambers, and thence up into the condensing or settling chambers, the diamond-shaped box serving as a deflector to direct the current into the flour-chamber. This draft can be produced either by a fan, blower, or by a chimney constructed above the chest, as preferred. This draft or current of air not only enters the flour-chamber and keeps the air in it fresh and pure, but it draws off with it, in its upward passage, the fine floating flour that is lost in the ordinary bolting process, and carries it up into the upper or settling chamber, where it settles, and provides a new and superior grade of flour. X is a cover, which I place over the settling-chambers, in the center of which is an opening covered by wire-gauze or muslin. The chimney, if one is used, is constructed above this opening.

The flour is conveyed out of the chambers by screw-conveyers in the usual way.

By ventilating the reel-chambers, while the operation of bolting is going on the cloth is kept in good condition, so as to bolt the flour more freely, thus doing more work with less bolting area, and preventing the cloth from rotting or decaying.

By saving the fine dust I am able to produce more flour, and that saved in the settling-chambers is far superior in quality, especially for pastry purposes, to any flour heretofore produced by any other process. Another advantage in drawing off this fine impalpable flour and saving it is the prevention of explosions in flour-mills, as this floating flour is known to be explosive, and has often created great loss of life.

The close cast heads keep the chop from "specking" the flour, as they effectually cut off all chance for any particles to be drawn back into the flour in the flour-chamber. Both the feeding and discharging operations are done outside of the heads, thus enabling the miller to pack a larger quantity of flour, as he can work without fear of "specks."

By discharging at the center of the reel I obtain a greater fall for spouting the chop, and prevent the chop from being drawn back into the flour-chamber by the action of the reel.

Having thus described my invention, what I claim, and desire to secure by Letters Patent, is—

1. The combination, with the reel-head D, having the V-bearing, of the driving-wheel L, with its flange, through which pass the bolts or fastenings connecting it to the head, provided around said fastenings with slots $a'$, substantially as and for the purpose set forth.

2. The combination of the beams or bridge-tree P with the shoes Q, having enlarged chambers to permit the vertical and endwise movements of the beam, and the adjusting and tightening screws, substantially as and for the purpose set forth.

3. The combination of the reel-chambers A, separated by the walls or partitions B, forming a space through which air may be forced into the reel-chamber, and means, substantially as described, for producing such air-currents, substantially as above specified.

4. A flour-bolt having the reel-chambers A, with the separating air space or tube, with its upper end entering a settling-chamber, in combination with the steam-pipe located in the air or draft tube, substantially as and for the purpose specified.

5. In a flour-bolt, the combination, with the reel-chambers A A, and the superposed settling-chambers S, having an opening and the deflector V, of the intermediate draft or air-tube having the centrally-located deflector U, and upon each side of the latter deflector openings communicating with the reel-chambers, and itself extending into the settling-chamber, substantially as and for the purpose set forth.

6. The settling-chambers S, with their double partitions $t$ and hood or deflector V, arranged as described above the flour or reel chambers, in combination with the reel or flour chambers, separated by the double walls B B, having lateral openings communicating with said chambers, and the diamond-shaped deflector or box U, all combined and arranged substantially as and for the purpose described.

In witness whereof I have hereunto set my hand and seal.

ALEXANDER P. GROSS. [L. S.]

Witnesses:
J. W. GROSS,
W. FLOYD DUCKETT.